United States Patent [19]
Song et al.

[11] Patent Number: 6,050,494
[45] Date of Patent: Apr. 18, 2000

[54] SMART CARD

[75] Inventors: Man-gon Song, Yongin; Si-han Kim, Seoul; Seung-bae Lee, Kun-po, all of Rep. of Korea

[73] Assignee: Samsung Display Devices Co., Ltd., Kyungki-do, Rep. of Korea

[21] Appl. No.: 09/092,009

[22] Filed: Jun. 4, 1998

[30] Foreign Application Priority Data

| Jun. 9, 1997 | [KR] | Rep. of Korea | 97-23654 |
| Oct. 23, 1997 | [KR] | Rep. of Korea | 97-29463 |

[51] Int. Cl.⁷ .............................. G06K 19/06; G02F 1/13; G02F 1/1333
[52] U.S. Cl. ................... 235/492; 349/1; 349/158
[58] Field of Search ................ 235/492; 349/1, 349/151, 158

[56] References Cited

U.S. PATENT DOCUMENTS

| 3,751,137 | 8/1973 | Fitzgibbons et al. | 350/160 |
| 4,876,441 | 10/1989 | Hara et al. | 235/488 |
| 5,244,840 | 9/1993 | Kodai et al. | 437/214 |
| 5,870,163 | 2/1999 | Watanabe et al. | 349/149 |

*Primary Examiner*—Thien M. Le
*Assistant Examiner*—Daniel H. Sherr
*Attorney, Agent, or Firm*—Leydig, Voit & Mayer, Ltd.

[57] ABSTRACT

A smart card includes a transparent circuit board on which an integrated circuit, function switches, a power source, and other parts are mounted, an upper substrate facing the circuit board, upper and lower electrodes respectively located on facing surfaces of upper substrate and the circuit board, orthogonal to each other, orientation films coating the upper and lower electrodes, and a liquid crystal material located and sealed between the upper and lower electrodes.

8 Claims, 7 Drawing Sheets

SMART CARD

BACKGROUND OF THE INVENTION

1. Field of the Invention

The present invention relates to a smart card, and more particularly, to a smart card employing a circuit board as a substrate board of a liquid crystal display device.

2. Description of the Related Art

A smart card refers to a type of electronic currency, an electronic purse, an electronic certificate of residence, or the like including electronic components such as an integrated circuit on a plastic substrate.

The electronic currency as an invisible form of money may be used in transactions with other people via the internet or an on-line system. The electronic currency can be more conveniently used than a credit card, and is expected to be a payment means for commercial trade instead of cash.

In addition, the electronic certificate of residence is a new type of identification card combining items such as a certificate of residence, a driver's license, a medical insurance card, etc. Also, other types of cards such as a credit card and a telephone card may be combined into such a smart card.

Since recent smart cards are provided with a power supply device, an image display device and function switches, the input content of the smart card can be referred to without a smart card reader.

FIG. 1 shows a conventional smart card. Referring to FIG. 1, the conventional smart card 100 includes a circuit board 110, and a front panel 160 and a frame 170 installed at the front and back surfaces of the circuit board 110, respectively, which protect and support the circuit board 110.

A liquid crystal display device 120 for displaying an image, a solar cell unit 180 for supplying power, at least one function switch 140, and an integrated circuit 150, which is electrically connected to parts mounted on the circuit board 110, are provided on the front surface of the circuit board 110.

Further, the liquid crystal display device 120, the function switch 140, the integrated circuit 150, and the solar cell unit 180 are exposed via windows 161 through 164 in the front panel 160.

Referring FIG. 2, the liquid crystal display device 120 includes upper and lower glass substrates 121 and 122 facing each other with a spacer interposed therebetween, ITO electrodes 123 and 124 respectively provided on the inside surfaces of the upper and lower glass substrates 121 and 122 and orthogonal with respect to each other, and orientation films 126 and 127 formed on the ITO electrodes for orienting liquid crystal 125.

The liquid crystal 125 between the upper and lower glass substrates 121 and 122 is sealed by sealing material 131. In addition, polarization plates 132 and 133 are attached to the outside surfaces of the upper and lower glass substrates 121 and 122, respectively.

In the smart card having the structure as described above, the thickness of the liquid crystal display device 120 is an obstacle to making the smart card thin. Accordingly, the advantage of the smart card of being conveniently carried is diminished.

SUMMARY OF THE INVENTION

To solve the above problem, it is an objective of the present invention to provide a thin smart card by integrally forming a circuit board and the lower substrate of the liquid crystal display device.

Accordingly, to achieve the above objective, there is provided a smart card including a transparent circuit board in which an integrated circuit, function switches, a power source and the other parts are installed, an upper substrate installed to face the circuit board, upper and lower electrodes respectively formed on the facing surfaces of upper substrate and the circuit board to be orthogonal with respect to each other, orientation films coated on the upper and lower electrodes, and liquid crystal sealed between the upper and lower electrodes.

Also, the circuit board includes a substrate plate, a gas barrier layer formed on the substrate plate to prevent a predetermined gas from passing through the substrate plate, and an electrode attaching layer formed on the gas barrier layer.

BRIEF DESCRIPTION OF THE DRAWING

The above objective and advantage of the present invention will become more apparent by describing in detail a preferred embodiment thereof with reference to the attached drawings in which.

DESCRIPTION OF THE PREFERRED EMBODIMENTS

Figure 1:
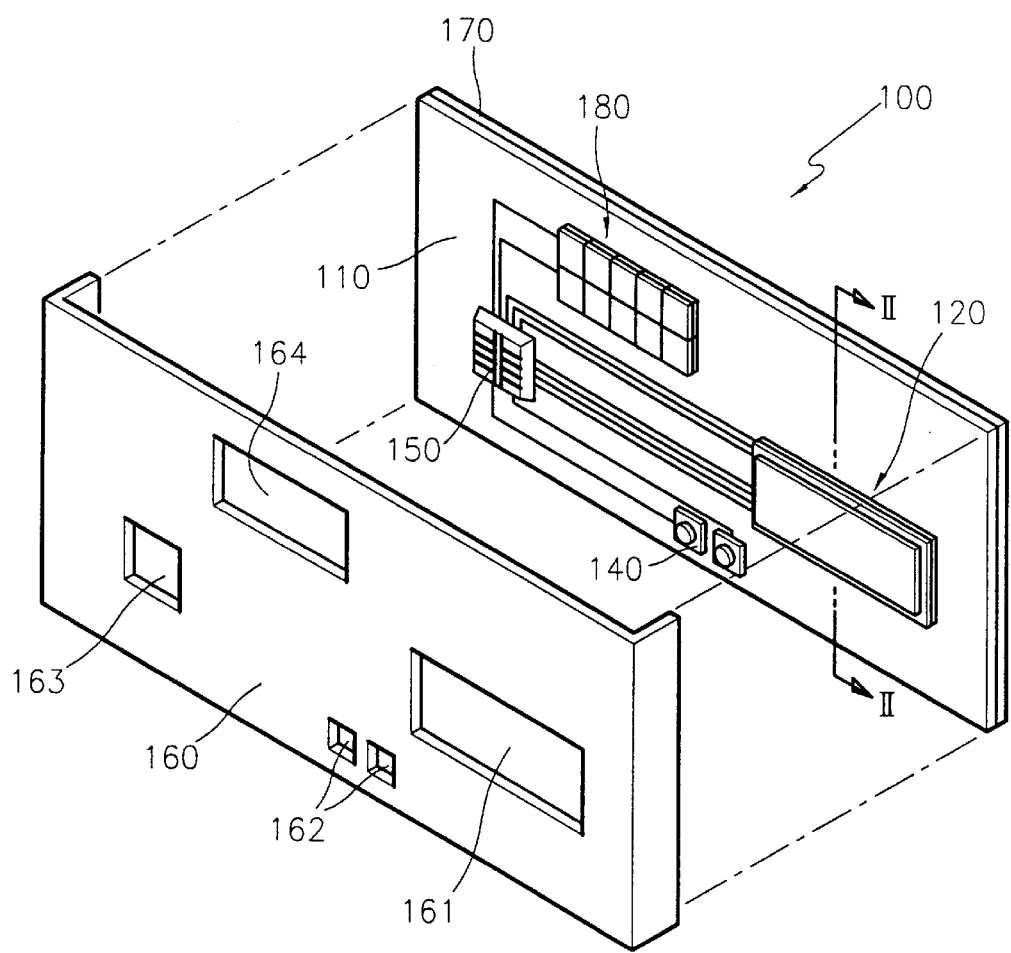
FIG. 1 is a exploded perspective view schematically illustrating a general smart card.
Figure 2:
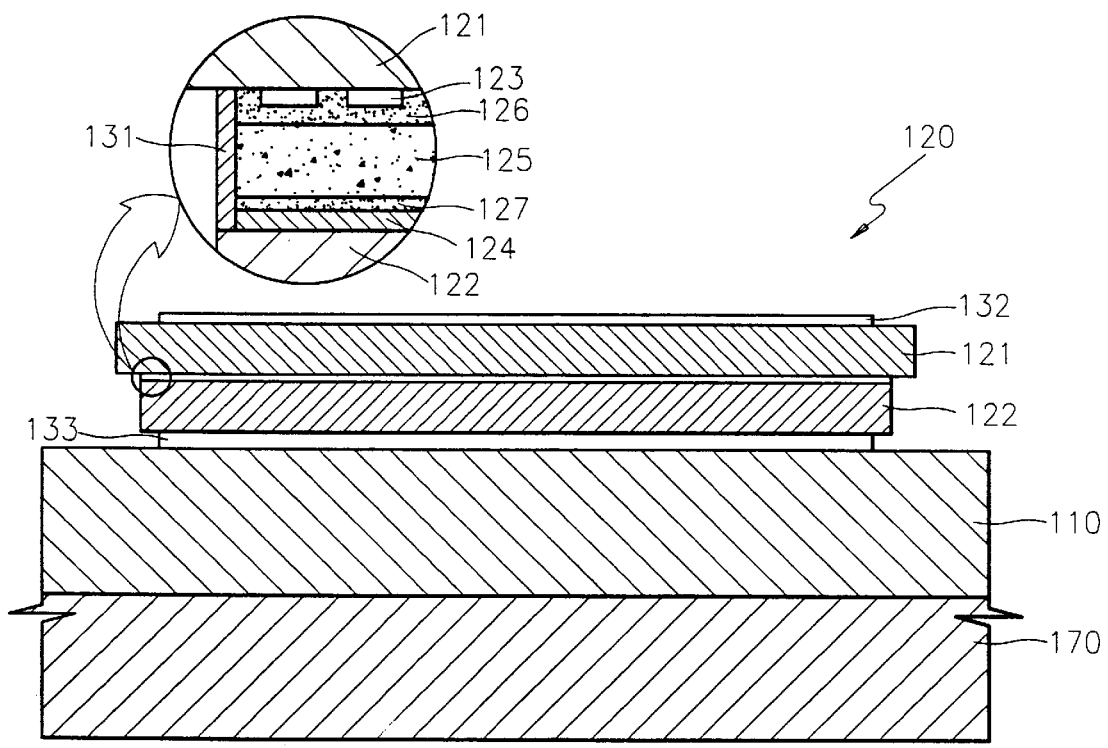
FIG. 2 is a section view taken along line II—II of FIG. 1.
Figure 3:
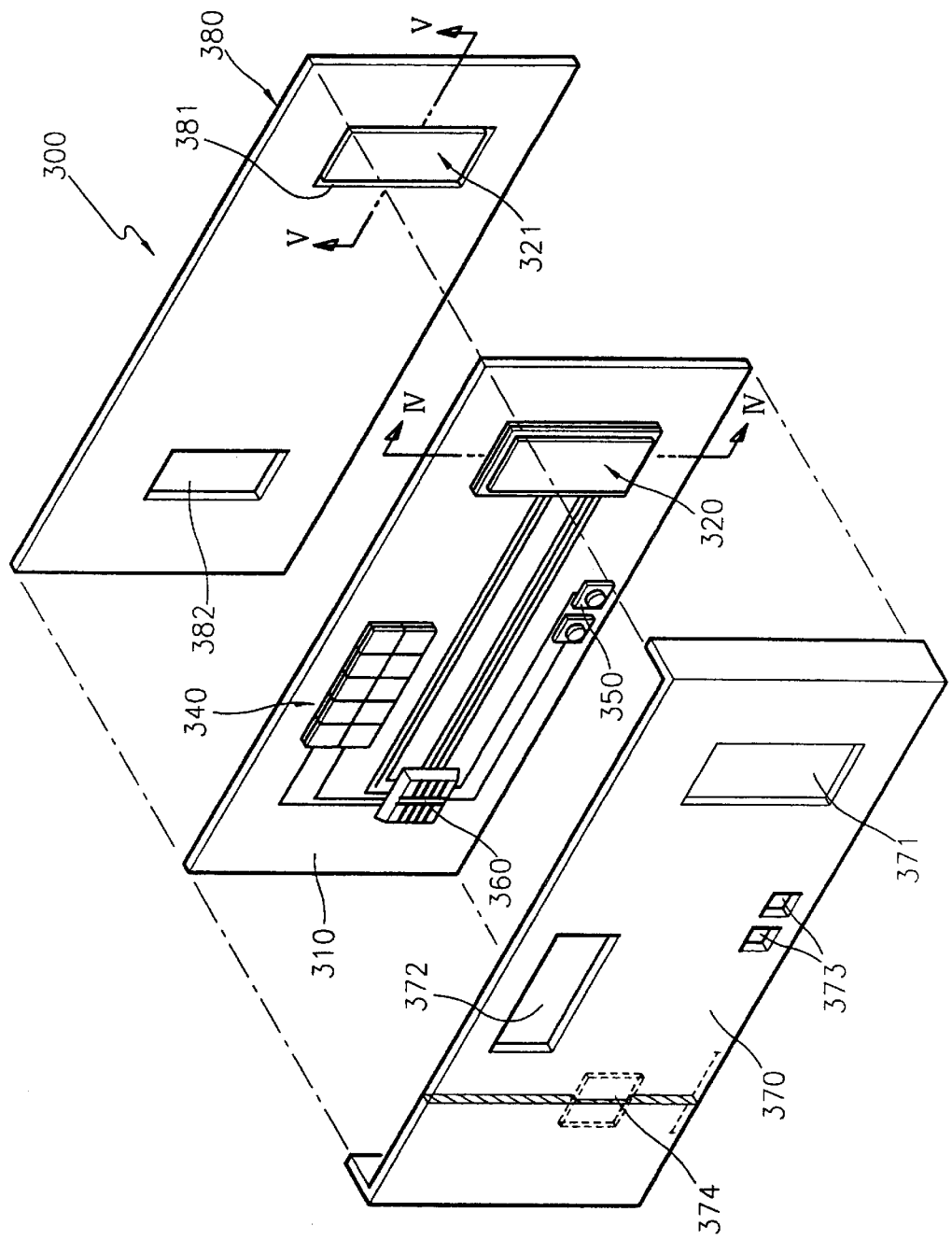
FIG. 3 is a exploded perspective view schematically illustrating an embodiment of a smart card according to the present invention.

Referring to FIG. 3, on the front surface of a circuit board 310 installed in a smart card 300 according to the present invention, a liquid crystal display device 320 for displaying an image, a solar cell unit 340 for supplying power, at least one function switch 350 for varying the image display of the liquid crystal display device 320, and an integrated circuit 360 which is electrically connected to all the above parts are mounted.

A front panel 370 is attached to the front of the circuit board 310. The front panel 370 is provided with windows 371, 372, and 373 exposing the liquid crystal display device 320, the solar cell unit 340, and the function switches 350. In addition, since the integrated circuit 360 is, when assembled, inserted into a recess 374 of a predetermined depth in the inside surface of the front panel 370, the thickness of the smart card 300 can be reduced.

The function switches 350 are for inputting data, and to adjust the image displayed on the liquid crystal display device 320, and scroll switches are preferably employed. Further, since the integrated circuit 360 has arithmetic functions, keys (not shown) for inputting data, such as numbers and operators, may be provided in the smart card 300.

Furthermore, though not shown in the drawings, the leads of the integrated circuit 360 are electrically connected to terminals for external connections, located on the back surface of the circuit board 310, through the conductive hole in the circuit board 310. The terminals are exposed to the outside through an opening 382 formed in a frame 380.

Figure 4:
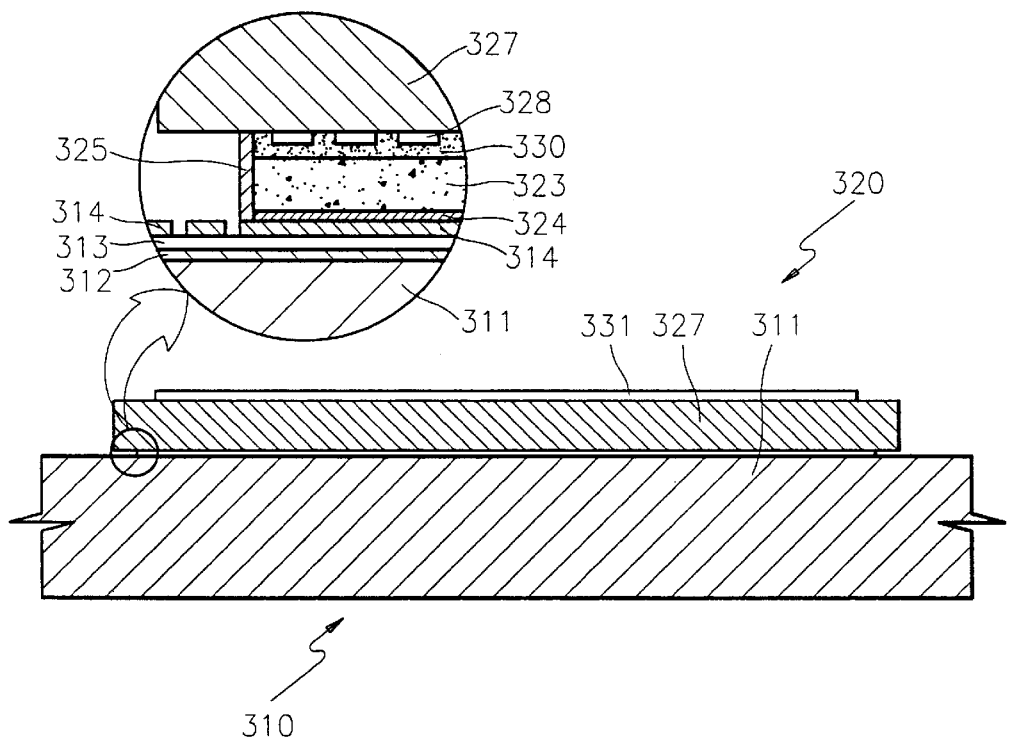
FIG. 4 is a section view taken along line IV—IV of FIG. 3.

FIG. 4 shows the structure of the liquid crystal display device 320. Referring to FIG. 4, the liquid crystal display device 320 is integrally formed with the circuit board 310.

That is, according to the characteristic of the present embodiment, the circuit board 310 is used as a lower substrate of the liquid crystal display device 320.

For this, function the front surface of the circuit board 310 is formed as follows.

A gas barrier layer 312 is formed on the substrate plate 311, which is made of flexible glass or transparent plastic of a polymer resin, and an electrode attaching layer 313 is formed on the gas barrier layer 312. The glass substrate is preferably borosilicate which is produced by adding alumina ($Al_2O_3$) to a mixture of silica ($SiO_2$) and boron oxide ($B_2O_3$). Thus, the substrate plate 311 provided with a gas barrier 312 and the electrode attaching layer 313 is used as a lower substrate of the liquid crystal display device 320.

That is, to form the liquid crystal display device 320 on the circuit board 310, the lower electrodes 314 are formed on the electrode attaching layer 313. Then, the upper substrate 327, the upper electrodes 328, the upper and lower orientation films 330 and 324, etc., as shown in FIG. 4, are formed using conventional methods.

Liquid crystal 323 is injected into the space between the upper and lower orientation films 330 and 324, and is sealed by sealing material 325. In addition, spacers (not shown) are interposed in the liquid crystal 323 to maintain a gap between the upper substrate 327 and the circuit board 310.

Since the substrate plate 311 allows air to pass through when the substrate plate 311 is made of a polymer resin, the gas barrier layer 312 on the substrate plate 311 prevents air or a gas from passing through the circuit board 310. The electrode attaching layer 313 is for expediting the formation of the lower electrodes. Preferably, the gas barrier layer 312 and the electrode attaching layer 313 are made of silica ($SiO_2$).

Further, it is preferable that the birefringence value of the circuit board 310 is less than 50 nm, because the birefringence value of parts other than the liquid crystal layer of the liquid crystal display device 320 must be minimized.

It is preferable that when the lower electrodes 314 are formed, an electrode pattern of lines connecting the integrated circuit 360 to the other parts, as shown in FIG. 3, as well as the lower electrodes of the liquid crystal display device 320, be formed at the same time.

Figure 5:
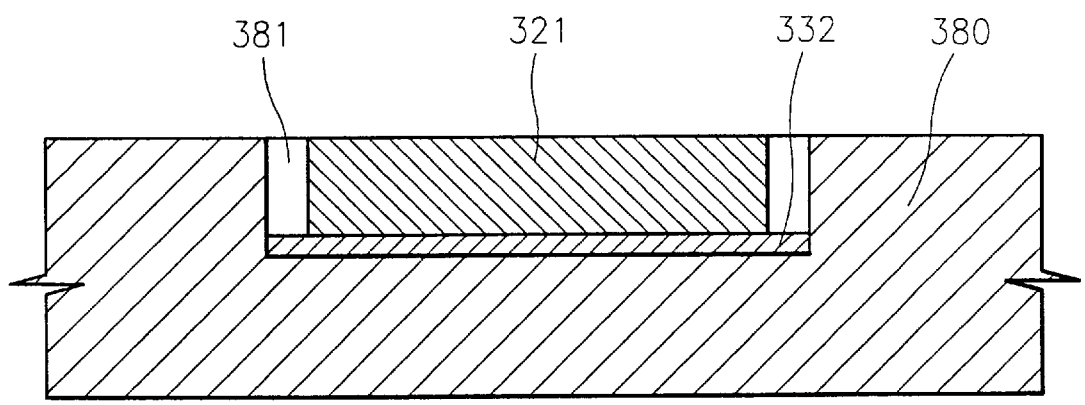
FIG. 5 is a section view taken along line V—V of FIG. 3.

A polarization plate 331 is attached to the outside surface of the upper substrate 327. In addition, as shown in FIGS. 3 and 5, a lower polarization plate 321 of the liquid crystal display device 320 is inserted into a recess 381 formed by cutting out a portion of the frame 380, located at the rear of the circuit board 310, to a predetermined depth. This allows the thickness of the smart card to be reduced.

Further, a reflective plate 332, of a thin aluminum layer, is installed between the lower polarization plate 321 and the frame 380. When the reflective plate 332 is used, the liquid crystal display device 320 has the same function as a reflective type liquid crystal display device.

According to this embodiment, since the lower substrate of the liquid crystal display device 320 is replaced with the circuit board 310, and the lower polarization plate 321 is installed in the recess 381 of the frame 380, the thickness of the smart card 300 can be reduced.

Figure 6:
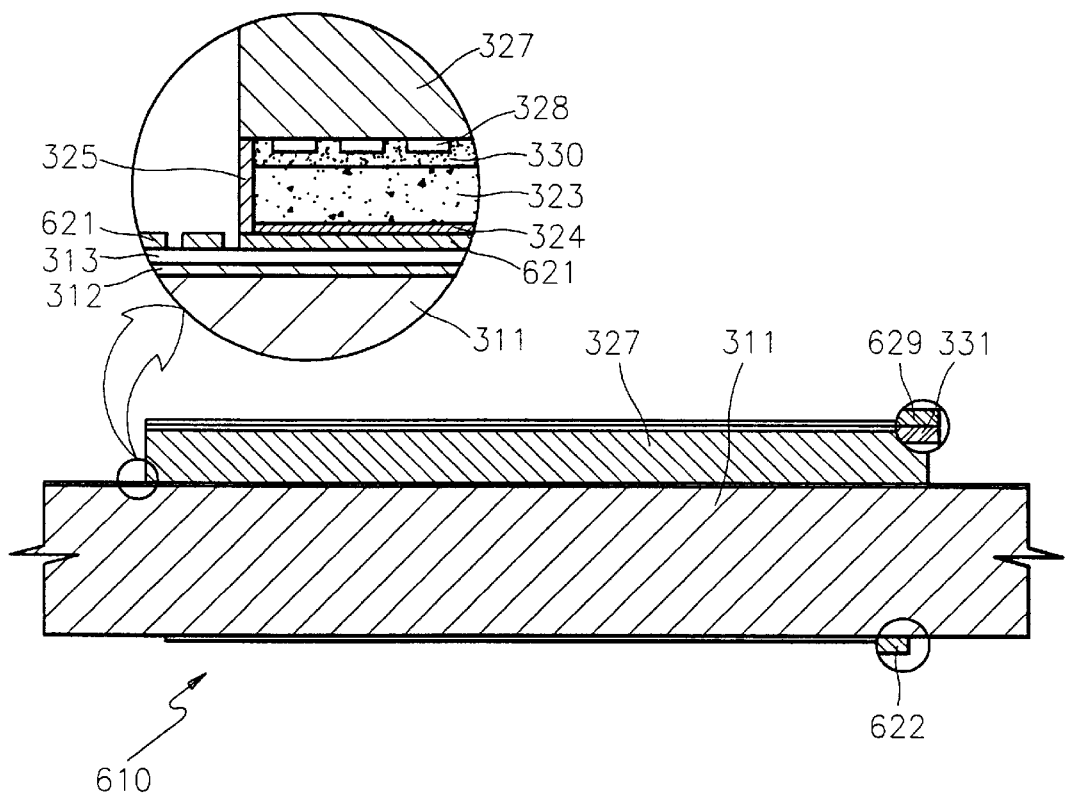
FIG. 6 is a section view illustrating another embodiment of a smart card according to the present invention.
Figure 7:
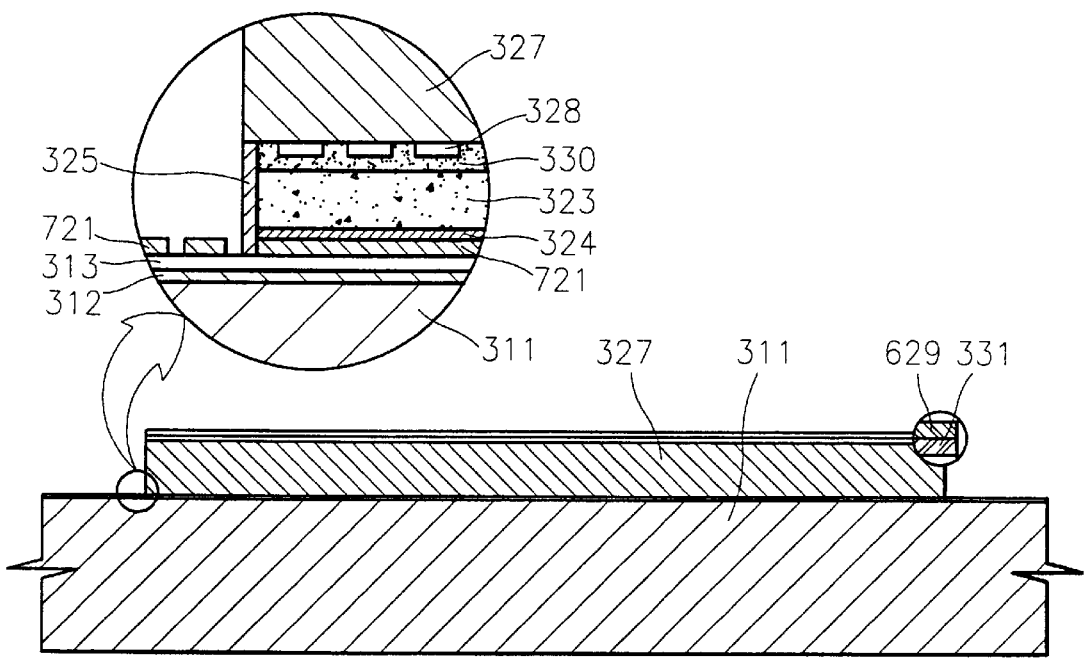
FIG. 7 is a section view illustrating still another embodiment of a smart card according to the present invention.

FIGS. 6 and 7 shows an embodiment of a reflective type liquid crystal display device according to the present invention. The same reference numerals as those of FIG. 4 denote similar members having similar functions.

Referring to FIG. 6, indium tin oxide (ITO) lower electrodes 621 are formed on the substrate plate 311, and other parts employed in the liquid crystal display device are formed by the same method as used in the previous embodiment. A gas barrier layer 312 and an electrode attaching layer 313 are located between the substrate plate 311 and the ITO lower electrodes 621. A hard coating film 629 may be disposed on the upper polarization plate 331 to protect the upper polarization plate 331.

In addition, a reflective plate 622 is located on the lower surface of the circuit board 610 having the ITO lower electrodes 621. The reflective plate 622 is formed by vapor deposition of a thin aluminum layer, or by attaching an aluminum foil as thin as possible.

FIG. 7 shows a liquid crystal display device with reflective lower electrodes. That is, the reflective electrodes 721 are located on a substrate plate 311. In this case, the reflective electrodes 721 function as both lower electrodes and a reflective plate, and no separate reflective plate is needed.

In addition, a gas barrier layer 312 and an electrode attaching layer 313 are located between the substrate plate 311 and the reflective electrodes 721.

According to the present invention, the smart card can be kept thin by employing the circuit board as the lower substrate of the liquid crystal display device. Further, since the liquid crystal display device is directly assembled to the circuit board, the manufacturing process is simplified.

What is claimed is:

1. A smart card including:

a transparent circuit board on which an integrated circuit, function switches, a power source, and other parts are mounted;

an upper substrate mounted facing the circuit board;

upper and lower electrodes respectively located on facing surfaces of the upper substrate and the circuit board and orthogonal to each other;

orientation films coating the upper and lower electrodes; and a liquid crystal material located in the space and sealed between the upper and lower electrodes.

2. The smart card as claimed in claim 1, wherein the circuit board includes:

a substrate plate;

a gas barrier layer on the substrate plate to prevent gas from passing through the substrate plate; and an electrode attaching layer on the gas barrier layer.

3. The smart card as claimed in claim 2, wherein the substrate plate is a flexible thin glass plate containing borosilicate.

4. The smart card as claimed in claim 2, wherein the upper and lower substrates are transparent plastic.

5. The smart card as claimed in claim 1, comprising:

an upper polarization plate attached to an outside surface of the upper substrate; and a frame with a recess in which a lower polarization plate is located, attached to a lower surface of the circuit board.

6. The smart card as claimed in claim 1, comprising a reflective plate located on a lower surface of the circuit board.

7. The smart card as claimed in claim 6, wherein the reflective plate is an aluminum film.

8. The smart card as claimed in claim 1, wherein the lower electrodes are reflective.

* * * * *